(12) United States Patent
Berger

(10) Patent No.: US 6,400,408 B1
(45) Date of Patent: Jun. 4, 2002

(54) TELEVISION SIGNAL PROCESSING DEVICE HAVING A DATA BLOCK ADDRESS MEMORY FOR AUTONOUSLY DETERMINING TELEVISION PROGRAM INFORMATION

(75) Inventor: Gerald Berger, Maria Enzersdorf (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/316,778

(22) Filed: May 21, 1999

(30) Foreign Application Priority Data

May 22, 1998 (EP) .............................................. 98890152

(51) Int. Cl.[7] ........................... H04N 7/087; H04N 7/08
(52) U.S. Cl. ........................ 348/465; 348/478; 348/906; 348/705; 348/473; 348/468; 725/39; 725/137; 725/20; 386/83
(58) Field of Search ................................. 348/465, 468, 348/460, 473, 474, 476, 477, 478, 479, 906, 705, 714; 386/83, 46, 95; 725/39, 40, 20, 136, 137, 141; H04N 7/08, 7/087

(56) References Cited

U.S. PATENT DOCUMENTS

| | | | | |
|---|---|---|---|---|
| 4,519,003 A | * | 5/1985 | Scholz | 358/335 |
| 4,977,455 A | * | 12/1990 | Young | 358/142 |
| 5,343,300 A | | 8/1994 | Hennig | 348/478 |
| 5,614,940 A | * | 3/1997 | Cobbley et al. | 348/906 |
| 5,650,826 A | * | 7/1997 | Eitz | 348/468 |
| 5,659,367 A | * | 8/1997 | Yuen | 348/465 |
| 5,661,526 A | * | 8/1997 | Hamamoto et al. | 348/465 |
| 5,737,477 A | * | 4/1998 | Tsutsumi | 386/83 |
| 5,991,498 A | * | 11/1999 | Young | 386/83 |
| 6,043,849 A | * | 3/2000 | Imanaka et al. | 348/468 |
| 6,111,612 A | * | 8/2000 | Ozkan et al. | 348/465 |
| 6,289,170 B1 | * | 9/2001 | Nagano et al. | 386/83 |

FOREIGN PATENT DOCUMENTS

| | | | |
|---|---|---|---|
| DE | 3527939 | 2/1987 | H04N/7/087 |
| EP | 0337336 A2 | 10/1989 | H04N/7/087 |
| EP | 0447968 | 9/1991 | H04N/7/087 |

* cited by examiner

Primary Examiner—John W. Miller
Assistant Examiner—Jean W. Désir
(74) Attorney, Agent, or Firm—Edward W. Goodman

(57) ABSTRACT

A television signal processing device (12) for receiving and processing a television signal (F) and an information signal (I) which contains television program information (FPI) about future television programs. The television signal processing device (12) has television program information determining means (34) by which television program information (FPI) can be determined from the teletext information (TI) of all receivable television signals (F) and can be stored. The television program information determining means (34) are now adapted to autonomously store in a data block address memory (37) at least one teletext page number (TSN) in correlation with television signal identification information (FKI) which identifies the television signal (F) containing the received teletext information (TI). The stored teletext page number (TSN) then identifies a teletext page of the television signal (F) from which television program information (FPI) has been derived successfully the last time. During a subsequent determination of television program information (FPI) from teletext information (TI) of this television signal (F) the teletext page identified by the stored teletext page number (TSN) is first searched for television program information (FPI).

9 Claims, 3 Drawing Sheets

| Keyword | Recurrence count |
|---|---|
| Children | 3 |
| Austria | 4 |
| Golf | 2 |
| Championship | 4 |
| Sailing | 1 |
| Opera | 2 |
| Soccer | 7 |
| Airplane | 1 |
| Magnum | 6 |
| Dreamboat | 1 |
| Computer | 4 |
| Diana | 7 |
| News | 12 |
| Garden | 3 |

FIG.3

TELEVISION SIGNAL PROCESSING DEVICE HAVING A DATA BLOCK ADDRESS MEMORY FOR AUTONOUSLY DETERMINING TELEVISION PROGRAM INFORMATION

The invention relates to a television signal processing device for autonomously determining television program information, having receiving means for receiving a television signal in a receiving channel receivable by the receiving means and for receiving an information signal which comprises data blocks containing data block information and which is receivable recurrently in blanking intervals of the television signal, and having an information detection stage for detecting data block information identified by a given data block address in each receiving cycle of the received information signal, and having television program information determining means for determining television program information contained in data block information detected by means of the information detection stage and for presetting at least one further data block address for the information detection stage in order to determine further television program information contained in the information signal, and having a switching stage for autonomously switching over the receiving means for the reception of at least one further television signal comprising an information signal in blanking intervals via at least one further receiving channel so as to enable further television program information to be determined autonomously.

Such a television signal processing device of the type defined in the opening paragraph, included in a television set, is known from the document is known from the document EP 0 337 336 A2. The known television set has receiving means with which it is possible to receive a television signal from a television station as for example ARD, ZDF or CNN in a receiving channel. A received television signal can be displayed as a television program on a viewing screen of the television set.

The receiving means are further adapted to receive an information signal transmitted in blanking intervals of a television signal. The information signal conveys digital data including VPS information (Video Program System; European Telecom Standard ETS 300 231) and teletext information. Each television program received as a television signal is identified by given VPS information. VPS information also includes television signal identification information which identifies a television signal and by means of which the television station which makes a television signal available and which transmits this signal can be identified. Teletext information of a television signal may include television program information about television programs of one or more receiving channels which can be received, for example, within the next week. Television program information can be formed by digital data representative of television signal identification information, the date, the starting and ending time, the title as well as the VPS information of a television program.

Teletext information can be received as data block information in data blocks formed by teletext pages, in successive receiving cycles of equal contents which recur approximately every 30 to 60 seconds. The known television set has an information detection stage formed by a teletext microprocessor which can be preset to a teletext page formed by a data block address. and which is adapted to detect the teletext page identified by the teletext page number and contained in the teletext information.

The known television set further comprises television program information determining means for determining and storing television program information contained in teletext information contained in the television signals which can be received by the receiving means. For this purpose, the television program information determining means use a television program information determining algorithm with which television program information is determined by presetting teletext page numbers for the teletext microprocessor and by evaluating the teletext information detected by the teletext microprocessor for a received television signal and said television program information is stored in a television program memory. In accordance with the television program information determining algorithm, after television program information has been derived from the teletext information of a television signal, the receiving means can be switched over independently by a switching stage in order to receive a further receivable television signal which transmits teletext information in the blanking intervals of the television signal in order to derive television program information from the teletext information of this television signal and store this in the television program memory. The receiving means can be switched over so often by the switching stage in order to receive a further television signal that television program information from all the information signals of receivable television stations is received and is stored in the television program memory. In the known television set the television program information determining algorithm is carried out fully autonomously and automatically once a day, for example in the morning because time television sets are generally not used at this time.

During the execution of the television program information determining algorithm the known television set is adapted to detect teletext page numbers which refer to teletext pages from which television program information can be derived. For this purpose, the television program information determining means are adapted to compare VPS information currently received by the receiving means with teletext information received during a receiving cycle. When the received VPS information is found in the received teletext information a teletext page number can be detected which identifies the teletext page containing this VPS information. The detected teletext page number can be applied to the information detection stage by the television program information determining means in order to detect teletext information identified by the teletext page number during the next receiving cycle. Further television program information can be derived from teletext pages bearing increasing teletext page numbers.

By the actuation of a key of the remote control device of the known television set the television set can display a list of receiving suggestions which is derived from the television program information stored in the television program memory and which contains the titles and starting times of television programs and television signal identification information of the television stations from which these television programs can be received currently or shortly.

However, with the known television set it has been found that the detection of teletext page numbers which identify teletext page numbers from which television program information can be derived cannot be effected reliably because temporarily VPS information, which serves to identify a currently receivable television program, is not presented and transmitted correctly by the television stations or because television program information contained in a teletext page temporarily contains incorrect VPS information about a television program. Moreover, VPS information may have been presented and transmitted correctly by a television station or may appear correctly in the television program information but may not be received correctly as a result of a comparatively poor reception quality of the received television signal. In both cases the television program information determining means cannot detect agreement between VPS information received by the receiving means and VPS information contained in the teletext information received during a receiving cycle. As a consequence, no television program information can be derived from a television signal from such a television station in such cases, as a result of which a list of receiving suggestions generated by means of the detected television program information is incomplete.

Furthermore, the television program information determining algorithm of the known television set requires relatively much time to determine television program information because it is first necessary to derive for each receiving channel a first teletext page number of a teletext page containing television program information from the information signal before subsequently further television program information of further teletext pages is determined.

Moreover, the known television set only enables the detection of television program information from television stations which transmit VPS information, as a result of which the list of receiving suggestions can display only television programs from a comparatively smaller number of television stations.

It is an object of the invention to eliminate the aforementioned problems and to provide an improved television signal processing device of the type defined in the opening paragraph. In a recording arrangement of the type defined in the opening paragraph this object is achieved in that a data block address memory has been provided, in which at least one item of television signal identification information, which identifies a received television signal, or receiving channel identification information can be stored in correlation with at least one data block address which identifies a data block of an information signal contained in a television signal received in a receiving channel, and in that each time that television program information is determined successfully in detected data block information, the television program information determining means are adapted to autonomously store the last preset data block address in the data block address memory in correlation with television signal identification information, which identifies the received television signal, or receiving channel identification information, and in that after switching over of the receiving means by the switching stage a data block address stored in the data block address memory in correlation with television signal identification information, which identifies the received television signal, or receiving channel identification information, can be applied autonomously to the information detection stage by the television program information determining means in order to detect data block information identified by the data block address. Thus, it is achieved that during an autonomous determination of television program information by means of the television signal processing device the television program information determining means can read a data block address from the data block address memory from whose associated data block formed by a teletext page already television program information could be derived successfully during a preceding determination of television program information. A successful determination of television program information can be detected by checking whether the teletext information contained in a detected teletext page complies with a standard for television program information, such as for example the VPT standard (Video recorder Programming by Teletext). Thus, it is possible to realize a television program information determining algorithm for which it is not necessary to determine each time anew teletext page numbers which identify teletext pages from which television program information is derivable. Consequently, such a television program information determining algorithm allows television program information to be determined particularly reliably and rapidly.

On the one hand, teletext page numbers of teletext pages from which television program information has been derived with success can be stored in correlation with television signal identification information, which has the advantage that a television signal from a television station which can be received via a plurality of receiving channels is always stored in correlation with the same last determined teletext page number. On the other hand, such teletext page numbers can also be stored in correlation with receiving channel identification information which identifies the receiving channel via which the television signal is received, which has the advantage that this is possible independently of the fact whether television signal identification information can be derived from the received television signal.

For the first time successfully determining teletext page numbers which identify teletext pages containing television program information can be effected, for example, as in the known television set by comparing received VPS information with VPS information received in teletext information. However, such teletext page numbers may also be stored in the television signal processing device during the manufacture of the television signal processing device, or they can be determined in a particularly advantageous manner in accordance with the measures defined in Claim 3.

It is to be noted that a further television signal processing device is known from the document DE 35 27 939 C2, which device has a memory in which television signal identification information identifying a receivable television signal can be stored in correlation with at least one data block address formed by a teletext page number. In a television program information determining algorithm television program information is derived from special teletext pages identified by stored teletext page numbers, which special teletext pages have been prepared for this by the television station and contain given television program information. In this known television signal processing device the teletext page numbers should be entered by a user via a control device, which is a great disadvantage in comparison with the television signal processing device in accordance with the invention. Furthermore, when a television station changes teletext page numbers of such special teletext pages, a user should again enter teletext page numbers by means of a control device in order to ensure that the television program information contained in these special teletext pages remains subsequently available. Moreover, the special teletext pages contain only television program information of the currently receivable television program and a television program which is receivable subsequently to the received television signal, as a result of which a list of receiving suggestions derived from this television program information is only of little value for the user.

In a television signal processing device as defined in Claim 1 it has proved to be advantageous to take the measures defined in Claim 2. Thus, it is achieved that once television program information has been detected for a multitude of television programs from different television stations can be selected in accordance with search criteria such as keywords, VPS information or starting times in order to draw up a selection of television programs which are of interest to the user and to display this selection in a list of receiving suggestions. Furthermore, by deriving the television program information from the data block information and storing only the television program information in the television program memory the storage capacity of the television program memory is used particularly efficiently.

In a television signal processing device as defined in Claim 1 it has proved to be advantageous to take the measures defined in Claim 3. Preferential data block addresses which are formed by teletext page numbers and which identify teletext pages with teletext information from which further teletext page numbers can be derived which identify further teletext information from which television program information can de derived, are known for example as so-called "Basic TOP Table", "Multi Page Table" or "Magazine Inventory Page" (ARD/ZDF/ZVEI Guideline: "TOP" System for Teletext). Determining television program information can be effected particularly rapidly and reliably when in accordance with the measures defined in Claim 3 television program information is derived directly from the teletext pages defined in the preferential data block information by the television station.

In a television signal processing device as defined in Claim 3 it has proved to be advantageous to take the measures defined in Claim 4. As a result of this, it is achieved that television program information which can be received in data sub-blocks formed by teletext sub-pages in a plurality of receiving cycles in succession and, consequently, not in each receiving cycle of the information signal can be determined particularly reliably and rapidly. This is because it is not necessary to observe—as stated for example in EP 0 447 968 B1—waiting cycles to determine whether a teletext page has teletext sub-pages. Moreover, this prevents a teletext sub-page contained in the information signal from being overlooked.

In a television signal processing device as defined in Claim 3 it has proved to be advantageous to take the measures defined in Claim 5. As a result of this, it is achieved that, for determining data block information the information detection stage can only be preset to data block addresses which identify data blocks which are actually transmitted in the received information signal. This precludes waiting times which would occur if the information detection stage would be preset to a data block address that is not transmitted in the information signal.

In a television signal processing device as defined in Claim 1 it has proved to be advantageous to take the measures defined in Claim 6. Thus, it is achieved that, starting from a first data block address which identifies a data block from whose data block information most recently television program information could be derived with success, television program information can be determined systematically from adjacent data blocks. This is advantageous particularly because in most cases television program information is contained in data block information of adjacent data blocks, such as for example in the teletext pages 301 to 304 and the television program information can thus be determined particularly rapidly.

In a television signal processing device as defined in Claim 1 it has proved to be advantageous to take the measures defined in Claim 7. Thus, it is achieved that additional information for an information signal which has already been determined once by the television program information determining means and which can be used advantageously during a subsequent determination of television program information, need not be determined again. Additional information can be, for example, information that VPS information, VPT information or time information has already been detected one time in teletext information, or information whether a teletext page has teletext sub-pages.

In a television signal processing device as defined in Claim 3 it has proved to be advantageous to take the measures defined in Claim 8. Thus, it is achieved that television program information can be determined in parallel from teletext information of at least two teletext pages, which enables television program information to be determined even more rapidly.

It has proved to be advantageous to include a television signal processing device as defined in Claim 1 in a recording and/or reproducing arrangement. As a result of this, a recording and/or reproducing arrangement such as for example a video recorder is obtained by means of which television program information can be determined autonomously as well as reliably and rapidly from a plurality of teletext information items transmitted in blanking intervals of television signals.

The afore-mentioned as well as further aspects of the invention will be apparent from the embodiment described hereinafter by way of example and will be elucidated with reference to this embodiment.

FIG. 3 shows a keyword table which can be stored in a keyword memory of the video recorder.

Figure 1:
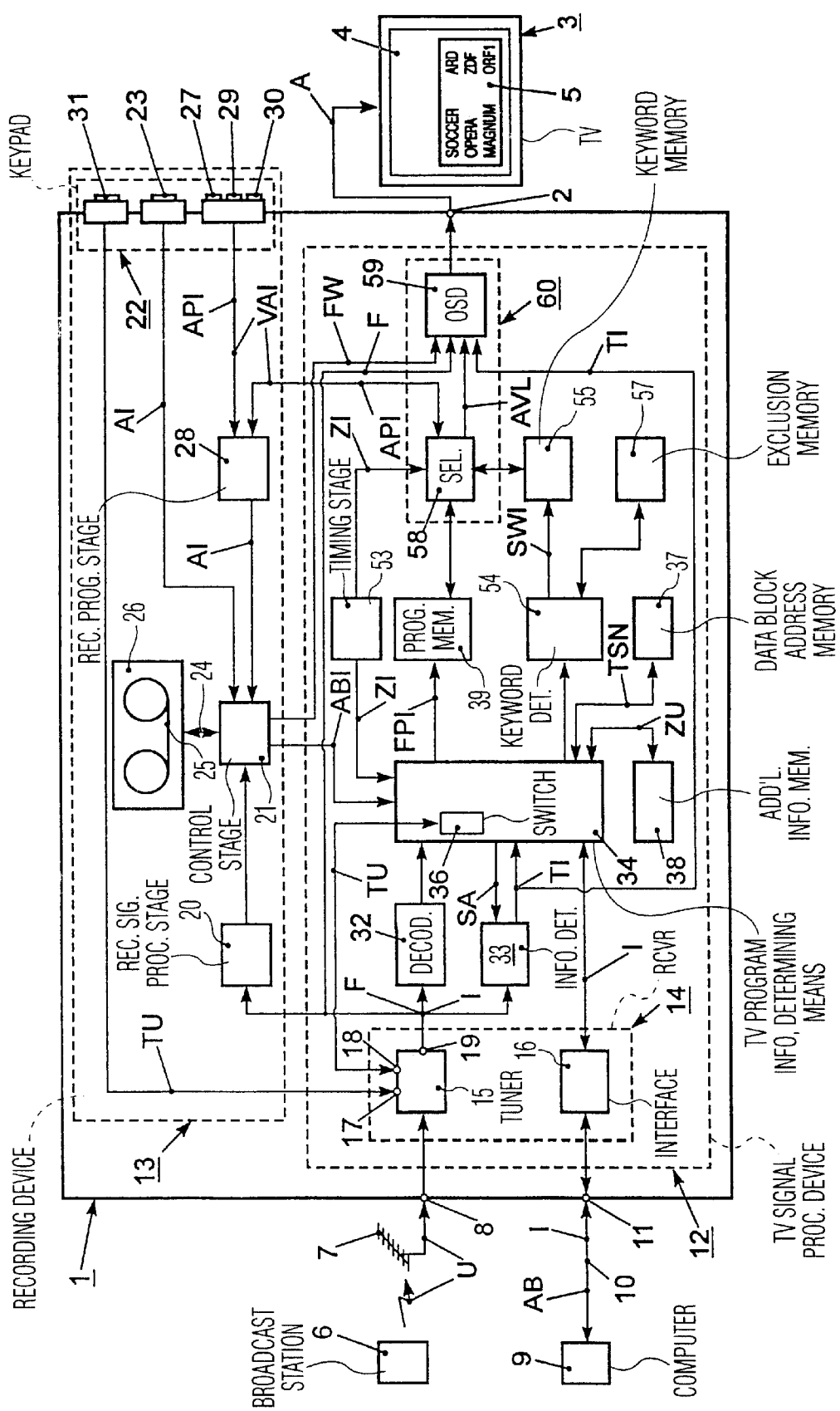
FIG. 1 is a block diagram of a video recorder which forms a recording arrangement and which includes a television signal processing device having keyword detection means for determining character strings of a title as a keyword which is indicative of the field of interest of a user of the video recorder.

FIG. 1 shows a video recorder 1 which constitutes a recording arrangement. A display signal A can be applied from an output terminal 2 of the video recorder 1 to a television set 3 which forms a display means connected to the output terminal 2. A display signal A comprises a television signal F, which can be displayed as a television program on a viewing screen 4 of the television set 3 and, if applicable, an OSD signal, which can be displayed on the viewing screen 4 as a so-called on-screen display 5 and which contains text information.

A broadcasting station 6 can transmit a transmission signal U, which can be received by means of a receiving antenna 7. A transmission signal U comprises a plurality of television signals F from different television stations, which signals are each transmitted via a receiving channel E. A receiving channel E, which is identified by a frequency band of the transmission signal U transmits for example a television signal F which conveys television programs from the television station ORF1 and which is identified by television signal identification information FKI. Television signals F which convey television programs from the television stations ORF2, ARD, ZDF and other television stations, some of which are identified by further television signal identification information FKI, are transmitted via further receiving channels E.

In some of the television signals F transmitted by the broadcasting station 6 information signals I are transmitted in blanking intervals of the television signals F, in which blanking intervals no picture or sound information is transmitted. An information signal I conveys digital data containing VPS information (Video Program System) and teletext information TI. Each television program received as a television signal F is identified by given VPS information. Moreover, the VPS information of an information signal I also includes television signal identification information FKI which identifies the television signal F. Teletext information TI can be received as data block information in data blocks, which are known as teletext pages, in successive receiving cycles having the same content which recur substantially every 30 to 60 seconds. Teletext information TI of a television signal F may contain a multitude of information such as for example news information, weather information and inter alia also television program information FPI of television programs from one or more television stations. The television program information FPI can be information which includes television signal identification information FKI such as the date, the starting time and ending time, title information representing the title as well as the VPS information of a given television program. As a rule, teletext information TI includes television program information FPI of television programs which can be received, for example within the next week, as a television signal F via a television channel E, which television signal is identified by television signal identification information FKI included in the teletext information TI. A transmission signal U received by the receiving antenna 7 can be applied to an input terminal 8 of the video recorder 1.

A computer 9 can supply a further information signal I containing further television program information FPI to an information signal terminal 11 of the video recorder 1 via a data link 10 of a computer data network. The computer 9 then forms a so-called server which is connected to the internet and which stores current television program information FPI about television programs from a large number of television stations in digital form. Television program information FPI stored in the computer 9 can be retrieved by the video recorder 1 via the data link 10 as an information signal I. For this purpose, the video recorder 1 can transfer call information AB from the information signal terminal 11 to an internet address which identifies the computer 9. When call information AB appears the computer 9 is enabled to transfer the television program information FPI stored in the computer 9 to the information signal terminal 11 of the video recorder 1 via the data links 10.

The video recorder 1 comprises a television signal processing device 12 and recording means 13. The television signal processing device 12 is adapted to process a transmission signal U received at the input terminal 8 and an information signal I applied to the information signal terminal 11, and also to independently derive television program information FPI from the received information signals I. The television signal processing device 12 includes receiving means 14 formed by a tuner 15 and interface means 16. The interface means 16 of the receiving means 14 are connected to the information signal terminal 11 and, as explained hereinbefore, are adapted to receive an information signal I from a computer data network.

The tuner 15 is connected to the input terminal 8 and is adapted to receive at least one television signal F contained in the transmission signal U over at least one receiving channel E which is receivable by the receiving means 14 and to receive an information signal I conveyed in the blanking intervals of a television signal F, which information signal comprises data blocks containing data block information and can be received in recurring receiving cycles. The data block information is then formed by teletext information TI and the data blocks by teletext pages.

A so-called tuner voltage TU can be applied to the tuner 15 via the tuner inputs 17 and 18. When a tuner voltage TU appears, a television signal F transmitted in the transmission signal U via the receiving channel defined by the tuner voltage TU, together with an information signal I which may be contained in the television signal F, can be supplied to a tuner output 19 of the tuner 15.

The recording means 13 include a recording signal processing stage 20 to which a received television signal F supplied to the tuner output 19 can be applied. A received television signal F processed in the recording signal processing stage 20 can be applied to a control stage 21 of the recording means 13. The recording means 13 further include a keypad 22 having a plurality of keys for controlling the video recorder 1. The keys include a recording key 23 by means of which a recording activation signal AI can be applied to the control stage 21 to activate a recording mode of the video recorder 1. The recording means 13 are adapted to record a processed and received television signal F of a television program in the recording mode. For this purpose a processed and received television signal F from the control stage 21 can be recorded on a magnetic tape 25 of a magnetic-tape cassette 26 via a recording and playback line 24. Such a recording and playback line 24 by means of which a processed and received television signal F can be recorded and played back in accordance with a helical-scan recording and playback method in conformity with the VHS standard is known since long.

The keypad 22 further comprises keys, represented here as a Show-View programming key 27, by means of which the recording means 13 can be programmed in accordance with the well-known Show-View programming method in order to record a television program that can be received at a later instant. In accordance with the Show-View programming method a given numerical combination which identifies the date, the starting and ending time and the television signal identification information FKI of a television program can be entered in order to program the recording means 13 for recording this television program. A numerical combination entered by means of the Show-View programming keys 27 as recording programming information API can be applied to a recording programming stage 28 of the recording means 13. In a manner not shown in FIG. 1, the recording programming stage 28 is adapted to supply a recording activation signal AI to the control stage 21 for recording a scheduled television program exactly at the instant at which the scheduled television program is received by the video recorder 1.

The keypad 22 further comprises keys, represented here as a suggestion programming key 29, which in a simple manner enable a television program to be programmed for recording, of which television program the title is displayed on the on-screen display 5 of the viewing screen 4 and which is marked by a user of the video recorder 1, as will be described in more detail hereinafter.

The keypad 22 further comprises keys, represented here as a marking key 30, by means of which a character string of text information shown on the on-screen display 5 can be marked, as will also be described in more detail hereinafter.

The keyboard 22 further comprises keys, represented here as a receiving channel selection key 31, by means of which in a manner not shown in FIG. 1 tuner voltages TU can be generated and applied to the tuner input 17 of the tuner 15. Actuation of the receiving channel selection key 31 allows a user of the video recorder 1 to select a television signal F from the television signals F transmitted in the transmission signal U via receiving channels E, which television signal is available on the tuner output 19 of the tuner 15.

A television signal F on the tuner output 19 together with an information signal I which may be present in blanking intervals of the television signal F can be applied to a decoder stage 32 of the television signal processing device 12. The decoder stage 32 is adapted to detect VPS information which may be present in the information signal I.

A television signal F appearing on the tuner output 19 together with an information signal I which may be present in blanking intervals of the television signal F can further be applied to an information detection stage 33 formed by a so-called teletext IC. The information detection stage 33 is adapted to detect data block information identified by a given data block address in each receiving cycle of the received information signal I and thus to detect teletext information TI contained in the information signal I. The information detection stage 33 can be preset with a data block address formed by a teletext page number TSN, upon which the information detection stage 33 is adapted to detect the teletext page identified by the teletext page number TSN and teletext information TI contained therein in a receiving cycle of the received information signal I.

The television signal processing device 12 further comprises television program information determining means 34 for detecting and storing television program information FPI contained in one or more information signals I for the television signal F of television transmissions of at least one receivable receiving channel E and for thus detecting television program information FPI contained in data block information detected by means of the information detection stage 33. The television program information determining means 34 are further adapted to preset at least one further data block address for the information detection stage 33 to detect further television program information FPI contained in the information signal I. For this purpose, VPS information detected by the decoder stage 32 and teletext information TI detected by the information detection stage 33 can be applied to the television program information determining means 34.

The television program information determining means 34 use a program information determining algorithm by means of which television program information FPI can be determined from the teletext information TI supplied to the television program information determining means 34 by the information detection stage 33 and which is explained hereinafter with reference to a flow chart 35 shown in FIG. 2. The television program information determining means 34 include a switching stage 36 which during the execution of the television program information determining algorithm can independently switch the receiving means 14 to the reception of at least one further information signal I in blanking intervals of the television signal F in order to enable further television program information I to be determined independently by the television signal processing device 12. For this purpose, the switching stage 36 is connected to the tuner input 18 of the tuner 15 and is adapted to supply a tuner voltage TU which controls the tuner 15. This will described in greater detail in the description of the television program information determining algorithm.

The television signal processing device 12 further includes a data block address memory 37 which can store at least one item of television signal identification information FKI identifying a received television signal F or receiving channel identification information EKI with at least one associated data block address which identifies a data block of an information signal I contained in a television signal F received via a receiving channel E. Each receiving channel E that can be received by the tuner 15 is identified by receiving channel identification information EKI. In currently commercially available video recorders for example 99 receiving channels E can be stored at so-called program positions whose numbers form receiving channel identification information EKI. The data block address memory 37 can store a data block address formed by a teletext page number TSN for each item of receiving channel identification information EKI which identifies a receiving channel via which a television signal F can be received. During the manufacture of the video recorder 1 a teletext page number TSN=301 has been stored in the data block address memory 37 for each item of receiving channel identification information EKI because this teletext page number TSN identifies teletext information TI which very often contains television program information FPI for the currently known information signals I. During the manufacture of the video recorder 1 teletext page numbers TSN relating to teletext information TI containing the television program information FPI have been stored in the data block address memory 37, in correlation with television signal identification information FKI of those information signals I which contain television signal identification information FKI. The television program information determining means 34 are adapted to determine stored teletext page numbers TSN for received television signal F by comparing television signal identification information FKI of television signals F determined by means of the decoder stage 32 with television signal identification information FKI stored in the data block address memory 37. This will elucidated with reference to the flow chart 35.

The television signal processing device 12 further includes an additional information memory 38 in which additional information ZU about the information signal I can be stored, in correlation with television signal identification information FKI of the television signal F or receiving channel identification information EKI of the receiving channel E, which additional information has already been derived from an information signal I of a television signal F received via a receiving channel E in a television program information determining algorithm and can be used advantageously for a subsequent television program information determining algorithm. The additional information ZU can be, for example, information that VPS information, VPT information or time information has already been found in teletext information TI of a teletext page, or information whether a teletext page has teletext subpages. Teletext subpages contain teletext information TI which cannot be received in every receiving cycle of the information signal I. The teletext page having the teletext page number TSN= 301 has, for example, two teletext subpages. In this case only the teletext information TI of the teletext subpage 301/1 is received in one or more receiving cycles of the information signal I and subsequently only the teletext information TI of the teletext subpage 301/2 is transmitted in one or more receiving cycles. Additional information ZU can also be transmission information which indicates which teletext page numbers TSN are transmitted in the information signal I.

During the manufacture of the video recorder 1 additional information ZU about information signals I containing television signal identification information FKI has been stored in the additional information memory 38, in correlation with said television signal identification information FKI. The television program information determining means 34 are adapted to determine stored additional information ZU about received television signal F by comparison of television signal identification information FKI of television signal F detected by means of the decoder stage 32 with television signal identification information FKI stored in the additional information memory 38. Additional information ZU about information signals I facilitate and speed up the determination of television program information FPI in the television program information determining algorithm. This will be described in more detail with reference to the flow chart 35.

The television signal processing device 12 further includes a television program memory 39 in which television program information FPI derived from a received information signal I can be stored, which information relates to television programs which can be received for example within the next week from one or more television stations via one or more receiving channel E.

Hereinafter, the television program information determining algorithm executed in the television program information determining means 34 is explained with reference to the flow chart 35. The process in accordance with the flow chart 35 starts in a block 40, for example every day at 9.00 a.m. Most receiving channels E can already receive a television signal F at this time and it is known that video recorders are hardly used at that hour. As already explained hereinbefore, the television program information determining algorithm is carried out only when the video recorder 1 is not used by the user and, consequently, the television signal processing device 12 can independently carry out the television program information determining algorithm in accordance with the flow chart 35.

In a block 41 which is carried out subsequently to the block 40 it is ascertained whether the video recorder 1 is in a stand-by mode or whether the video recorder 1 is being used by a user, for example for playing back a recorded television program from the cassette 26. When the video recorder 1 is not in the stand-by mode the television program information determining algorithm is terminated in a block 42. Conversely, when the video recorder 1 is in the stand-by mode the television program information determining algorithm proceeds in the block 43.

In the block 43 the switching stage 36 supplies a tuner voltage TU to the tuner input 18 in order to achieve that the tuner 15 transfers a television signal F which can be received via the receiving channel E=1 to its tuner output 19.

In a block 44 which is carried out subsequently to the block 43 it is ascertained whether the television signal F available at the tuner output 19 contains teletext information TI in the blanking intervals of the television signal F. The television program information determining means 34 then supply page request information SA to the information detection stage 33 and it is checked whether the information detection stage 33 can detect teletext information TI. When the information detection stage 33 cannot detect teletext information TI because no information signal I is conveyed in the television signal F, the process of the flow chart 35 is continued in the block 45.

In the block 45 the switching stage 36 supplies a tuner voltage TU to the tuner input 18 so as to achieve that the tuner 15 transfers a television signal F which can be received via the receiving channel E=2 to its tuner output 19.

In a block 46 which is carried out subsequently to the block 45 it is ascertained whether in the process in accordance with the flow chart 35 all the receiving channels E that can be selected for receiving a television signal F have already been selected. If all the receiving channels E for receiving a television signal F have already been selected, the process is terminated in the block 42. Conversely, if all the receiving channels E which can be selected by the tuner 15 have not yet been selected, the process is continued in the block 44.

When in the block 44 it is found that an information signal I is conveyed in the television signal F received via the receiving channel E=2 and supplied to the tuner output 19, the process proceeds to a block 47. In the block 47 the television program information determining means 34 can preset a given preferential data block address formed by a preferential teletext page number VTSN defined by the switching stage 36 of the information detection stage 33 for a received information signal I. Such a preferential teletext page numbers VTSN are transmitted in the information signals I by television stations such as for example ORF1, ORF2 or ARD and are known for example as so-called "Basic TOP Table", "Multi Page Table" or "Magazine Inventory Page". During the manufacture of the video recorder 1 preferential teletext page numbers VTSN were stored in the additional information memory 38, in correlation with television channel identification information FKI. During the execution of the block 47 page request information SA containing this preferential teletext page number VTSN is applied to the information detection stage 33 and upon termination of a receiving cycle of the information signal I or upon expiry of a given time interval it is checked whether teletext information TI has been detected by the information detection stage 33. If teletext information TI has been detected by the information detection stage 33 teletext page numbers TSN can be derived from the detected teletext information TI, which page numbers identify the teletext information TI of the information signal I in which the television program information FPI is contained. In the present case, a detected teletext page number TSN can be impressed upon the information detection stage 33 as page request information SA. Furthermore, additional information ZU, such as for example the number of teletext sub-pages of a teletext page, can be derived from teletext information TI identified by a preferential teletext page number TSN and can be stored in the additional information memory 38 in correlation with the receiving channel identification information EKI of the selected receiving channel E. Subsequently, the process in accordance with the flow chart 35 proceeds in a block 48.

When in the block 47 no teletext information TI for the given preferential teletext page numbers VTSN can be derived from the information signal I the process in accordance with the flow chart 35 proceeds to the block 49. In the block 49, after a changeover of the receiving means 14 by the switching stage 36, the television program information determining means 34 can autonomously preset the information detection stage 33 to a data block address stored in the data block address memory 37 and allocated to television signal identification information FKI or receiving channel identification information EKI identifying the received television signal F, in order to determine data block information identified by the data block address. As the block 49 is carried out a teletext page number TSN is read from the data block address memory 37, which number has been stored in correlation with the number of the receiving channel E=2, which then constitutes receiving channel identification information EKI, and from which already television program information FPI could be derived in a preceding television program information determining algorithm or which during the manufacture of the video recorder 1 has been stored in correlation with the television signal identification information FKI received via the receiving channel E=2. The process in accordance with the flow chart 35 proceeds to the block 48 after a teletext page number TSN obtained from the data block address memory 37 has been preset in the information detection stage 33.

In the block 48 it is checked whether the teletext information TI detected by the information detection stage 33 contains television program information FPI. In a first step of this check it is verified whether the detected teletext information TI complies with the VPT standard (Video recorder Programming by Teletext) and, in addition, contains VPT information. If the teletext information TI complies with the VPT standard, which is the case for example for information signals transmitted by the television stations ORF1, ORF2, ARD or ZDF, in which hidden or visible VPT information identifying television program information FPI is contained in the teletext information TI, the television program information FPI can be determined in a particularly reliable manner.

When in the first step of the check in the block 48 it is found that the detected teletext information TI does not contain hidden VPT information in accordance with the VPT standard, it is verified in a second step of the check whether the hidden teletext information TI associated with the given teletext page number TSN is contained in a so-called "packet 26", which characterizes television program information FPI in teletext information TI identified by the teletext page number TSN. Information contained in a "packet 26" is defined in the PDC standard (Program Delivery Code).

When in the second step of the check in the block 48 it is found that the "packet 26" neither contains hidden information for the identification of television program information FPI in teletext information TI identified by the teletext page number TSN, it is checked in a third step whether teletext information TI corresponding to time information is contained in the teletext information TI detected by the information detection stage 33. For this purpose, the teletext information TI is examined for character strings which comply, for example, with the format "XX:XX" or "XX.XX", where "X" is a number from "0" to "9" and the first "X" should be a number from "0" to "2" and the third "X" a number from "0" to "5". These formats correspond to customary time representation formats such as, for example, "13:20" or "13.20". If character strings in accordance with these formats are detected in teletext information TI as time information which recurs at given intervals, as is customary for displaying a plurality of starting times and tittles of television programs in a teletext page, the first time information is interpreted as the starting time of a television program, characters following this number as the title of the television program and subsequent time information in the teletext information TI as the ending time of this television program.

When television program information FPI is already detected in the first step of the check in the block 48 the subsequent steps of the check are not carried out. Likewise, when television program information FPI is detected in the second step of the check in the block 48 the third step of the check is not carried out.

If in all the three steps of the check in the block 48 it is found that no television program information FPI is contained in the teletext information TI detected by the information signal detection stage 33, the process in accordance with the flow chart 35 proceeds in the block 50. Conversely, if in one of the three steps of the check in the block 48 television program information FPI is detected in the teletext information TI, the process in accordance with the flow chart 35 proceeds in the block 51.

In the block 51 television program information FPI determined by the television program information determining means 34 is stored in the television program memory 39. In the block 51 the television program information determining means 34 are adapted to autonomously store the last preset data block address in the data block address memory 37 in conjunction with television signal identification information FKI or receiving channel identification information EKI identifying the received television signal F after data block information has been derived successfully from television program information FPI. The teletext page number TSN to which the information detection stage 33 has been preset is then stored in the data block address memory 37, in correlation with the number of the receiving channel E received by the tuner 15, which number then forms receiving channel identification information EKI. Subsequently, the process in accordance with the flow chart 35 proceeds with the block 50.

In the block 50, in a first step after presetting of a first data block address obtained from the data block address memory 37, the television program information determining means 34 are adapted to successively preset further data block addresses which alternately have increasing and decreasing numbers in relation to the first data block address, in order to determine data block information. For example after presetting of a first teletext page number TSN=301 obtained from the data block address memory 37, the television program information determining means 34 are adapted to preset the teletext page number TSN=302 and, in a subsequent operation in the block 50 of the flow chart 35, to preset the teletext page number TSN=300. Thus, teletext information TI identified by teletext page numbers TSN around the first teletext page number TSN is determined from whose teletext information TI which they identify already television program information FPI was derived in a preceding process of determining television program information FPI.

In a second step of the block 50 the television program information determining means 34 are adapted to preset a teletext subpage number of a teletext page number preset in the first step if the additional information memory 38 stores additional information ZU for the received information signal I, indicating that the preset teletext page number has a teletext subpage number.

In a third step of the block 50 the television program information determining means 34 are adapted to verify whether the additional information memory 38 stores additional information ZU which forms transmission information about the teletext page numbers TSN transmitted in the received information signal I and, if the answer is affirmative, to check whether teletext page number TSN preset in the first step of the block 50 is actually transmitted in the information signal I and, if the answer is negative, to preset a further teletext page number TSN. As a result of this, it is achieved that for the detection of data block information the information detection stage 33 can only be preset to data block addresses which relate to data blocks which are actually transmitted in the received information signal I. This precludes waiting times which would occur if the information detection stage 33 was set to a data block address not transmitted in the information signal I.

In a fourth step of the block 50 the television program information determining means 34 are adapted to check, if applicable by evaluation of additional information ZU stored in the additional information memory 38, whether for the information signal I received by the tuner 15 via the receiving channel E already all the teletext page numbers TSN have been preset which identify, in the information signal I, teletext information TI from which television program information FPI may be derived. If no such additional information ZU has been stored, it is also possible to scan all the teletext pages conveyed in the information signal I for television program information FPI contained in the teletext information TI of these pages. If in the block 50 a teletext page number TSN has been found which identifies teletext information TI from which television program information FPI might be derived successfully, the process is continued in the block 52.

In the block 52 a teletext page number TSN determined in the block 50 is applied to the information detection stage 33 as page request information SA and teletext information TI detected by the information detection stage 33 is checked in the block 48 as explained hereinbefore.

If in the block 50 no teletext page number TSN could be detected which identifies teletext information TI from which television program information FPI could be derived with success, the process proceeds to the block 45. The process in accordance with the flow chart 35 will be described in more detail hereinafter with reference to an example.

The control stage 21 of the recording means 13 can supply recording mode information ABI to the television program information determining means 34 when the recording means 13 have been set to the recording mode. When recording mode information ABI occurs the television program information determining means 34 are adapted to determine the television program information FPI stored in the television program memory 39 during the television program information determining algorithm, which television program information FPI should be assigned to the television program recorded at that time by the recording means 13. For this purpose, the television program information determining means 34 are adapted to compare VPS information identifying the recorded television programs and detected by means of the decoder stage 32 with VPS information stored in the television program memory 39. In the case of correspondence of the detected and the stored VPS information the television program information FPI containing the stored VPS information can be read from the television program memory 39.

The television signal processing device 12 further includes a timing stage 53 which can apply time information ZI representing the current time to the television program information determining means 34. Time information ZI for the initialization of the time of the timing stage 53 can then be derived from the teletext information TI determined by the information detection stage 33 or can be set by a user of the video recorder 1 in a manner not shown in FIG. 1. When recording mode information ABI occurs if the television signal F of a television program is recorded in which no VPS information is transmitted, the television program information determining means 34 are adapted to determine the television program information FPI stored in the television program memory 13 and relating to the television program currently recorded by the recording means 13 on the basis of the time information ZI supplied to said means by the timing stage 53 and of the received receiving channel E.

The television signal processing device 12 further comprises keyword detection means 54 for determining at least one item of title fragment information of title information of a television program recorded by the recording means 13 as a processed and received television signal F. For this purpose, the keyword detection means 54 are arranged to receive a title of a television program recorded by the recording means 13, which title has been determined by the television program information determining means 34 and is contained in the television program information as title information. Title information is parsed into title fragment information which can be formed by words or parts of words and which are determined as keywords by the keyword detection means 54. This will be described in more detail with reference to an example given hereinafter.

The television signal processing device 12 further comprises a keyword memory 55 for storing at least one keyword determined by means of the keyword detection means 54 as keyword information SWI. This yields the advantage that all the automatically determined keywords are stored and thus a data base of keywords is obtained which is a very accurate representation of the user's interest profile with regard to the television programs recorded by the user and what future television programs he is likely to be interested in. This will be described in more detail with reference to an example given hereinafter.

In the keyword memory 55 a count of the occurrence of a keyword can be stored, which count can be incremented and store again each subsequent time that this keyword is found by the keyword detection means 54. Keywords and associated recurrence counts can then be stored in the keyword memory 55 as a keyword table shown in FIG. 3. Keywords whose recurrence counts have values below a minimum threshold value can be erased periodically from the keyword memory 55 by the keyword detection means 54. The keyword detection means 54 are adapted to define title fragment information only as a keyword if it has a minimum number of characters. This will also be described in more detail with reference to an example given hereinafter.

The television signal processing device 12 further comprises an exclusion memory 57 adapted to store at least title fragment information which is to be excluded as a keyword by the keyword detection means 54. During the manufacture of the video recorder 1 text information such as for example "if" or "maybe" or "against" are stored in the exclusion memory 57 because these words do not characterize the field of interest of a user.

The television signal processing device 12 further comprises selection means 58 for the selection of at least one television program whose title, which is contained in the television program information FPI, includes at least one given keyword and which currently or soon is or will be receivable as a television signal F via another than the receiving channel E being currently received. For this purpose, the selection means 58 are adapted to compare keyword information stored in the keyword memory 55 with television program title information stored in the television program memory 39. In response to this comparison the selection means 58 are adapted to generate a list of receiving or recording suggestions, which list contains television program information FPI of television programs which currently or soon are or will be receivable by the receiving means 14 as a television signal F of another receiving channel E currently received. The selection means 58 can preset only those keywords whose recurrence counts have values above a selection threshold value which depends on at least one other value of recurrence count stored in the keyword memory 55. This will be described in more detail hereinafter with reference to the example.

The television signal processing device 12 further includes OSD insertion means 59. The OSD insertion means 59 are arranged to receive a television signal F available on the tuner output 19 of the tuner 15. The OSD insertion means 59 are also arranged to receive a television signal FW reproduced from the magnetic tape 25 via the recording and layback line 24. The OSD insertion means 59 are further arranged to receive text information in the form of television program information FPI determined by the selection means 58 from a list of recording suggestions generated by the selection means 58. When text information supplied from the selection means 58 to the OSD insertion means 59 occurs said OSD insertion means are adaptedto generate a display signal A containing the text information and to supply the display signal to the output terminal 2. The selection means 58 and the OSD insertion means 59 thus form display signal generating means 60 which can automatically generate a display signal A which contains detected television program information FPI of a television program whose television signal is currently received by the receiving means 14. In addition, the display signal generating means 60 are adapted to automatically generate a display signal A containing television program information FPI of at least one television program selected by the selection means 58.

By actuating the suggestion programming key 29 suggestion activation information VAI can be supplied to the recording programming stage 28 and to the selection means 58. When suggestion activation information VAI occurs the display signal generating means 60, which are thus activated manually, are adapted to generate a display signal A representing television program information FPI of selected television programs. A display signal A generated by the display signal generating means 60 can be supplied to display means formed by the television set 3 so as to display a list of recording suggestions AVL containing selected television programs. Here, the recording programming means are formed by keys represented as the suggestion programming key 29, by the marking key 30, by the recording programming stage 28 and by the display signal generating means 59. With the aid of the recording programming means television program information FPI of one of the selected and displayed television programs can be marked manually by a user and thereby program the video recorder 1 so as to record the selected television program thus marked.

Teletext information TI detected by the information detection stage 33 can be applied to the OSD insertion means 59. When teletext information TI applied to the OSD insertion means 59 appears these means are adapted to generate a display signal A containing teletext information TI and to supply the display signal A to the television set 3 on which the teletext information TO can be displayed in a teletext display mode, which can be activated in a manner not shown in FIG. 1. By means of the video recorder 1 a user can manually mark at least title fragment information of an displayed item of teletext information TI and thereby define this information as a keyword and store it in the keyword memory 55.

The video recorder 1 and thus the recording means 13 are adapted to automatically record a television program selected by the selection means 58. For this purpose, the selection means 58 can supply recording programming information API to the recording programming stage 28. Recording programming information API includes all the television program information FPI necessary to program the recording of a television program selected by the selection means 56.

The advantages of the video recorder 1 will be illustrated hereinafter by means of an example. It is assumed that the receiving means 14 of the video recorder 1 can receive the television signal F from the television station ORF1 in the receiving channel E=1, the television signal F from the television station VOX in the receiving channel E=2, the television signal F from the television station NED1 in the receiving channel E=3, the television signal F from the television station RTL in the receiving channel E=4, and the television signal F from the television station C+ in the receiving channel E=5. It is to be noted that information signals I are transmitted in the blanking intervals of the television signals F from the television stations ORF1, NED1 and RTL, the information signal I from television station ORF1 conveying additional information ZU about its information signal I at a preferential teletext page number TSN=1F0 hex, and the television station NED1 transmitting a so-called "packet 26" and the television station ORF1 transmitting VPT information for identifying television program information FPI in their information signals I. In its information signal I the television station RTL also transmits television program information FPI but this information is not identified by VPT information, information in a "packet 26", or other hidden information.

Figure 2:
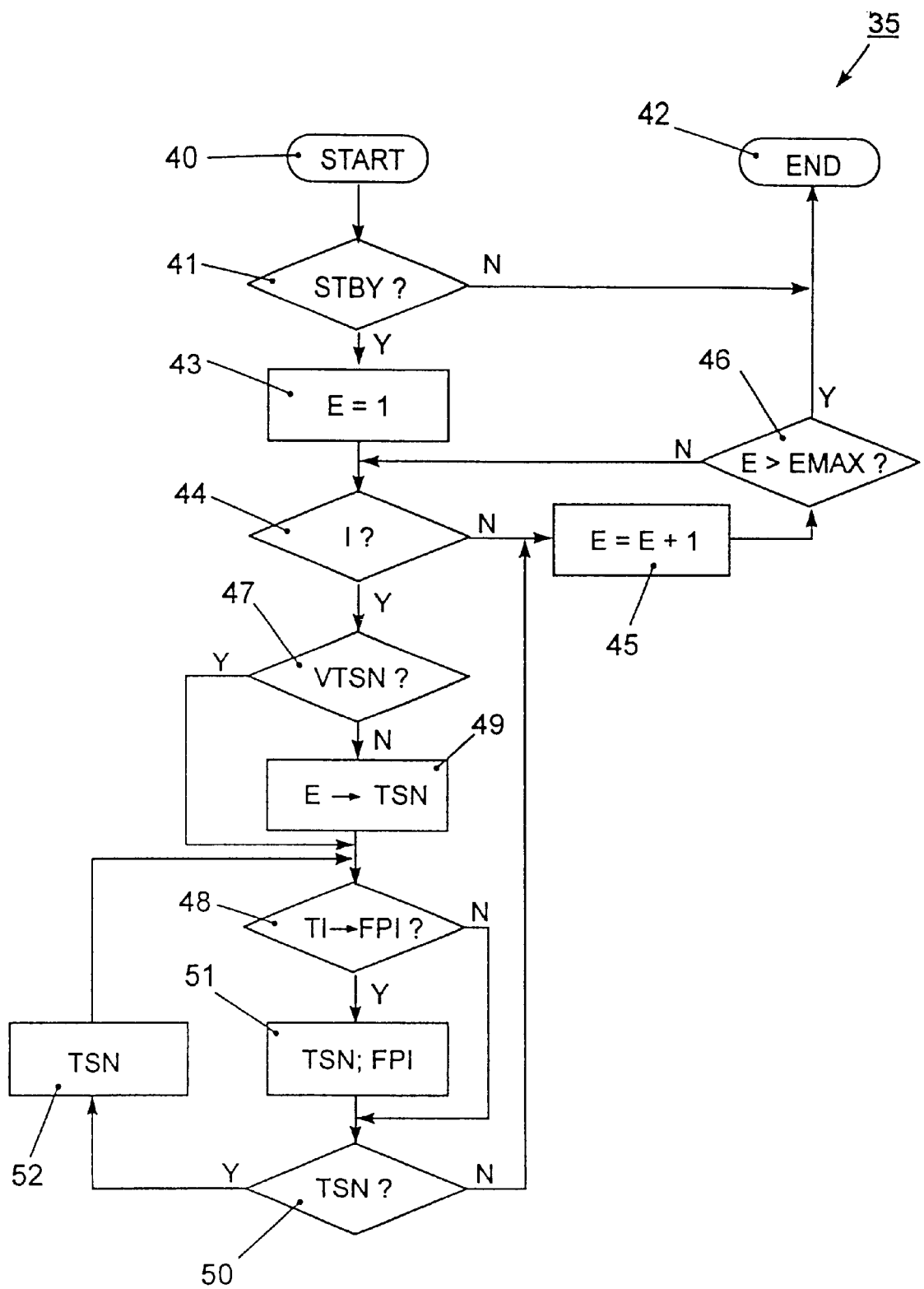
FIG. 2 is a flow chart by means of which it is possible to explain a television program information determining algorithm which is processed in television program information determining means of the television signal processing device.

It is further assumed that the time—for example 9:00 a.m.—is reached to which the video recorder 1 has been set, at which the television program information determining means 34 start the process in accordance with the flow chart shown in FIG. 2 in order to determine television program information FPI contained in information signals I. As already stated hereinbefore, the television program information determining algorithm starts in the block 40. In the block 41 it is found that the video recorder 1 has been set to its stand-by mode, upon which the process in accordance with the flow chart 35 proceeds to the block 43.

In the block 43 the television program information determining means 34 supply a tuner voltage TU to the tuner input 18 so as to achieve that the television signal F from the television station ORF1 receivable via the receiving channel E=1 is received at the tuner output 19.

In the block 44, as stated hereinbefore, it is detected that in blanking intervals of the television signal F from the television station ORF1 an information signal I is transmitted, as a result of which the process in accordance with the flow chart 35 proceeds to the block 47. The VPS information, which includes television signal identification information FKI which identifies the television signal F, is then also applied to the television program information determining means 34.

In the block 47, by comparison of the television signal identification information FKI determined by the decoder stage 32 with the television signal identification information FKI stored in the additional information memory 38 and by comparison of the receiving channel identification information EKI=1 formed by the number of the selected receiving channel E with the receiving channel identification information EKI stored in the additional information memory 38, it is checked whether a preferential teletext page number VTSN has been stored for the television signal F from the television station ORF1. The television program information determining means 34 then detect a preferential teletext page number VSTN=1F0 hex stored in the additional information memory 38, in correlation with the television signal identification information FKI of television station ORF1, during the manufacture of the video recorder 1. The television program information determining means 34 are then adapted to supply page request information SA containing the preferential teletext page number VTSN=1F0 hex to the information detection stage 33. From the teletext information TI detected by the information detection stage 33 the television program information determining means 34 derive that the information signal I includes television program information FPI in teletext information TI identified by the teletext page numbers TSN=311, which teletext page numbers TSN are stored, in correlation with the receiving channel identification information EK=1, as additional information ZU in the additional information memory 38. From teletext information TI identified by these teletext page numbers TSN television program information FPI about television programs transmitted by the television station ORF1 can be derived during subsequent processing in accordance with the flow chart 35. This yields the advantage that determining television program information FPI can be effected particularly rapidly and reliably because television program information FPI is derived directly from the teletext pages defined by the television station ORF1 in the preferential teletext page.

From the teletext information TI detected by the information detection stage 33 and identified by the preferential teletext page number VTSN it further appears that, for example, the teletext page number TSN=315 has two teletext subpage numbers TS N 315/1 and TSN=315/2. The television program information determining means 34 also store this information in the additional information memory 38 as additional information ZU in correlation with the receiving channel identification information EKI=1. This has the advantage that when television program information FPI is determined television program information FPI can be determined particularly reliably and rapidly from teletext information TI on teletext subpages because it is apparent from the teletext information TI identified by the preferential teletext page numbers VTSN for which teletext page numbers teletext information TI is available on teletext subpages. On the one hand, it is not necessary, as a result of this, to wait for one or more receiving cycles in order to find out that a teletext pages does not have any teletext subpages and, on the other hand, this precludes that teletext information TI from teletext subpages is overlooked in determining television program information FPI.

Furthermore, transmission information is derived from the teletext information TI identified by the preferential teletext page numbers VTSN, which transmission information specifies for which teletext page numbers TSN teletext information TI is transmitted in the information signal I. These teletext page numbers TSN are also stored in the additional information memory 38 as additional information ZU in correlation with receiving channel identification information EKI=1. As a result of this, the television program information determining means 34 will subsequently preset the information detection stage 33 only to page request information SA formed by teletext page numbers TSN which are actually transmitted in the information signal I. Thus, the advantage is obtained that waiting times are avoided which would occur if the information detection stage 33 would be preset to a teletext page number TSN which is not transmitted in the information signal I, which could otherwise be detected only after having awaited one or more receiving cycles of the information signal I.

Finally, in the block 47 the information detection stage 33 is preset to page request information SA for the detection of teletext information TI, which page request information contains for example the teletext page number TSN=313 derived from the teletext information TI of the preferential teletext page number VTSN.

Owing to the provision of the additional information memory 38 and the storage in the additional information memory 38 of additional information ZU about information signal I of television signals F receivable in receiving channels E, the advantage is obtained that once additional information ZU about an information signal I has been derived is used during each subsequent derivation of television program information FPI from these information signals I for a more rapid execution of the television program information determining algorithm.

In the block 48 it is checked whether the teletext information TI determined for the teletext page number TSN=313 actually contains television program information FPI, as specified in the preferential teletext page number VSTN. As explained hereinbefore, it is ascertained in the first step of the check in the block 48 whether VPT information is contained in the detected teletext information TI, which is the case for detected teletext information TI from the television station ORF1.

Television program information FPI thus determined of, for example, four television programs of the television station ORF1, which will be receivable for example in the television signal F from the television station ORF1 in the afternoon of the same day, is stored in the television program memory 39 in the block 51. This yields the advantage that, upon completion of the television program information determining algorithm, television program information FPI of a multitude television programs of different television stations are stored on the television program memory 39 and subsequently individual ones of these television programs care selected by the selection means 58 and can be displayed on the viewing screen 4 of the television set 3. Moreover, the storage capacity of the television program memory 39 is utilized particularly efficiently because the television program information FPI is derived from the teletext information TI and only the television program information FPI is stored in the television program memory 39.

Furthermore, in the block 51 the teletext page number TSN=313 is stored in the data block address memory 37 in correlation with the receiving channel information EKI=1. This has the advantage that in the case of information signals I such as for example those from the television stations NED1 or RTL, which do not transmit preferential teletext pages in their information signals I, the determination of television program information FPI in the block 49 is started with those teletext page numbers TSN from whose teletext information TI television program information FPI was determined successfully the last time. This has the advantage that it is not necessary to determine each time again a first teletext page number TSN which identifies teletext TI in which television program information FPI is transmitted. As a result, television program information FPI can be determined particularly reliably and rapidly.

In the block 50 teletext page numbers TSN are preset in the information detection stage 33 for the detection of teletext information TI containing television program information FPI in such a manner that after the first teletext page number TSN=313 has been preset the television program information determining means 34 subsequently presets the information detection stage 43 to teletext page numbers TSN=314, TSN 312; TSN=315 and TSN=311 whose numbers alternately increase and decrease with respect to the first teletext page number TSN=313 in order to determine teletext information TI. This has the advantage that, starting from a first teletext page number TSN, which identifies teletext information TI from which television program information FPI has been derived successfully, adjacent teletext pages are scanned systematically for television program information FPI.

It is to be noted that the television program information determining means 34 can also be preset to teletext page numbers TSN which alternately increase and decrease in a different manner, for example TSN=315, TSN=311, TSN=317 and TSN=309.

The blocks 48, 51, 50 and 52 are carried out until in the block 50 it is detected that television program information FPI has been derived from all teletext pages identifying teletext information TI which presumably contain television program information FPI. When this is detected, the tuner is switched to receive the television signal F from the television station VOX in the receiving channel E=2 in the block 45. In the block 444 it is found that in the television signal F from the television station VOX no information signal I is transmitted, for which reason the process in accordance with the flow chart 35 is continued on the block 45.

In the block 45 the tuner is switched to receive the television signal F from the television station NED1 in the receiving channel E=3. From the information signal I supplied by the television station NED1 television program information FPI is derived as described hereinbefore and in the block 47 it is then found that no preferential teletext page is transmitted in the information signal I. In the block 49 the teletext page number TSN=201 stored in the data block address memory 37 in correlation with the receiving channel identification information EKI=3 is determined from whose teletext information TI during a preceding process in accordance with the flow chart 35 television program information FPI could be derived successfully. This yields the advantage that television program information FPI can be derived particularly rapidly from the information signal I from the television station NED1.

In the block 48 which follows the block 49 it is found in the first step of the check in the block 48 that the teletext information TI detected by means of the information detection stage 33 does not contain VPT information.

In the second step of the check in the block 48 it is found that television program information FPI of the detected teletext information TI is identified by information contained in a so-called "packet 26". During a subsequent repeated execution of the blocks 51, 50, 52 and 48 all the television program information FPI is stored in the television program memory 39. After television program information FPI has been derived from all the teletext pages associated with "packet 26" the process in accordance with the flow chart 35 is continued in the block 45.

In the block 45 the television program information determining means 34 set the tuner 15 to the reception of the television signal F from the television station RTL via the receiving channel E=4. The further blocks 46, 44, 47 and 49 are carried out as described hereinbefore. In the first step of the check in the block 48 it is found that the teletext information TI detected by the information detection stage 33 does not contain VPT information and in the second step of the check it is found that the teletext information TI does not include "packet 26" information. In the third step of the check in the block 48 it is found that, as set forth hereinbefore, television program information FPI can be obtained by deriving time information from the teletext information TI. Television program information FPI which is subsequently determined in the blocks 48, 51, 50 and 52 is stored in the television program memory 39.

Since no additional information ZU about teletext pages in which television program information FPI is transmitted can be found for the information signal I from the television station RTL and neither any such additional information ZU is stored in the additional information memory 38, the blocks 48, 51, 50 and 52 are repeated until it is found in the block 50 that all the teletext page numbers TSN transmitted in the information signal I have been applied to the information detection stage one time. Subsequently, in the block 45 the receiving channel E=5 is selected in which the television signal F from the television station C+ is received. In the block 44 it is found that no information signal I is transmitted in the television signal F from the television station C+, for which reason a receiving channel E=6 is selected in the block 45. In the block 46 it is found that no television signal F is received in the receiving channel E=6 and, consequently, the television program information determining algorithm in accordance with the flow chart 35 is terminated in the block 42.

In the example which illustrates the advantages of the video recorder 1 it has further been assumed that television program information FPI about television programs of the television station VOX and C+ is stored in the computer 9 which forms an internet server. After completion of the process in accordance with the flow chart 35 to determine television program information FPI from teletext information TI the television program information determining means 34 are adapted to obtain television program information FPI from computers connected to the internet. For this purpose, the television program information determining means 34 are adapted to read an internet address stored in the additional information memory 38 during the manufacture of the video recorder 1 and to transfer the internet address thus read to the interface means 16. As already explained hereinbefore, the interface means 16 are then adapted to transfer call information AB to the computer 9 identified by the supplied internet address. An information signal I supplied by the computer 9 upon the occurrence of call information AB is applied to the television program information determining means 34 via the information signal terminal 11 of the video recorder 1 and the interface means 16. Television program information FPI of the television stations VOX and C+ contained in the information signal I is determined by the television program information determining means 34 and is stored in the television program memory 39. This has the advantage that an information signal I containing television program information FPI can also be received by the video recorder 1 from a computer data network such as the internet or, for example also from a TV cable system, and that television program information FPI can be derived from the information signal I thus received.

In the example given to illustrate the advantages of the video recorder 1 it is assumed that the keyword table 56 shown in FIG. 3 has been stored in the keyword memory 55. The keyword memory 56 stores keywords forming title fragment information, such as for example "children", "soccer" or "Diana". Each time that a user records a television program keywords are derived from the title of the television program, which forms title information, as will be described in more detail hereinafter. Since by recording a television program the user of the video recorder 1 shows that he is interested in this television program, the keywords derived from the titles of these television programs are characteristic of the field of interest of the user. A recurrence count associated with a keyword in the keyword table 56 indicates how many times a given keyword has already been detected. As is apparent from the keyword table 56, the keywords "soccer", "Magnum", "Diana" and "News" were detected very often in titles of television programs recorded by the user. This shows the interest of the user in television programs relating to "soccer", the television serial "Magnum", reports on "Diana" and "news".

The selection means 58 are now adapted to automatically determine television programs which can be received in the future and which are of interest to the user. For this purpose, the selection means 58 are adapted to read out keywords stored in the keyword memory 55, such as for example the keyword "Magnum", and to determine television program information FPI stored in the television program memory 39 and relating to television programs whose titles contain the keyword "Magnum". It is then determined, for example, by which television station and when another episode of the serial "Magnum" will be receivable. The television program information FPI of subsequent episodes of the serial "Magnum" thus determined can be displayed as an on-screen display 5 on the viewing screen 4 of the television set 3. This yields the advantage that the attention of the user of the video recorder 1 is drawn to television programs which are presumably of interest to the user and the user will not miss these.

The selection means 58 are adapted to determine a selection threshold value by forming the sum of the three largest values of the recurrence counts stored in the keyword memory 55—in accordance with the keyword table shown in FIG. 3 these are the values 12+7+7=26—and to divide this sum by the number 10–26/10=2.6. The selection means are henceforth adapted to use, for determining television programs in which a user may be interested, only those keywords whose recurrence counts have value which exceed the selection threshold value of 2.6 thus determined. As a result of this, the advantage is obtained that the selection means 58 only select those television programs whose titles contain a keyword which has already been detected comparatively often and which is therefore of special interest to the user. In this way, changing fields of interest of the user are allowed for automatically because the recurrence count of keywords such as for example "Magnum" are not incremented any further if no further episode of the serial "Magnum" is recorded.

It is to be noted that other methods of determining a selection threshold value are also possible.

Television program information FPI of television programs which are of interest to the user and which have been selected by the selection means 58 can be displayed on the on-screen display 5 automatically and for given time in a first and in a second case of use of the video recorder 1 and can be displayed as a list of recording suggestions on the on-screen display 5 through actuation of the suggestion programming key 29 by the user in a third case of use. In order to illustrate the advantages of the first case of use it is assumed that the user has set the tuner 15 to receive a television signal F from the television station RTL via the receiving channel E=4 by actuating the receiving channel selection key 31. As set forth hereinbefore, the selection means have detected that a further episode of the television serial "Magnum" is transmitted by the television station ORF1 for example at 18:00 hours as the starting time and, consequently, can be received via the receiving channel E=1. The selection means 58 are adapted to compare the time information ZI supplied to them with the starting times of the television programs selected by the selection means 58. If for example at 17:59 hours the selected television program "Magnum" will be receivable as a television signal F from the television station ORF1 via the receiving channel E=1 and the tuner has been set to receive the television signal F from the television station RTL via the receiving channel E=4, the display signal generating means 60 are adapted to automatically generate a display signal which contains the television program information FPI of this selected television program "Magnum". Thus, for example at 17:59 hours an on-screen display 5 is shown on the viewing screen 4 of the television set 3, for example for 5 seconds, to indicate the beginning of another episode of the television serial "Magnum" of the television station ORF1 via the receiving channel E=1. Thus, it is achieved advantageously that the attention of a user of the video recorder 1, while viewing a television program of a television station, is drawn to the beginning of a television program from another television station which is presumably of interest to the user by means of an on-screen display 5 briefly before the beginning of this television program. As a result of this, the user is reminded automatically and in due time of the beginning of television programs which are of interest to him.

In the second case of use the display signal generating means 60 are adapted to generate a display signal A so as to enable an on-screen display 5 on the viewing screen 4 of the television set 3, which immediately after the start of the video recorder 1 the user is notified, for example for 20 seconds, of television programs which are of interest to the user and which can be received at that time or which can be received soon. This has the advantage that immediately after the video recorder 1 has been switched on the user's attention is drawn to television programs which are of interest to the user.

Now the third case of use is described in which television programs F selected by the selection means 58 can be displayed on the viewing screen 4 of the television set 3. By actuation of the suggestion programming key 29 an on-screen display 5 is obtained on the viewing screen 4 of the television set 3, which shows the television program information FPI selected by the selection means 58 in a list of recording suggestions. Depending on the television program information FPI determined by the television program information determining means 34 and stored in the television program memory 39 the list of recording suggestions contains for example television program information FPI of television programs which can be received from the television stations ORF1, NED1, RTL, VOX and C+ within the next week. By actuating the marking key 30 the position of a cursor shown in the on-screen display 5 can be changed, thus enabling one of the selected and displayed television programs to be marked by the user. When one of the selected and displayed television programs is marked by the user the television program information FPI of this television program is transferred from the selection means 58 to the recording programming stage 28 and the video recorder 1 is then programmed to record this television program. This yields the advantage that a particularly simple method of programming the video recorder 1 to record a selected television program.

To illustrate the advantages of the video recorder 1 an example of the automatic determination of keywords from title information of television programs recorded by means of the video recorder 1 is described hereinafter. It is now assumed that the user of the video recorder 1 has activated the video recorder 1 in order to record a television program entitled "World Championship Soccer: Austria against Germany". The video recorder 1 may have been activated for this recording by an arbitrary programming method, for example by Show View programming, VPT programming or directly by actuation of the recording key 23. As described hereinbefore, the title of a recorded television program is determined in the television program information determining means 34 upon the occurrence of recording mode information ABI and is transferred to the keyword detection means 54. By the keyword detection means 54 the title "World Championship Soccer: Austria against Germany", which forms title information is parsed into the title fragment information "Soccer", "World", "Championship", "Austria", "against", and "Germany". Subsequently, the keyword detection means 54 determine whether one of the title fragment information items is stored in the exclusion memory 57. The keyword detection means 54 then detect that the title fragment information "against" is stored in the exclusion memory 57 because this title fragment information is not suitable for satisfactorily characterizing the user's interest. As a result of this, this title fragment information "against" is not interpreted as a keyword by the keyword detection means 54.

Subsequently, the keyword detection means 54 check whether each title fragment information item has a minimum number of at least four characters. This has the advantage that title fragment information items such as for example "the", "as" or "in" are not interpreted as keywords by the keyword detection means 54 because they neither adequately characterize the user's interest.

Keywords thus determined by the keyword detection means 54 are stored in the keyword memory 55. The keyword detection means 54 also determine whether a detected keyword such as for example "soccer" has already been detected and has consequently already been stored in the keyword memory 55. As is apparent from the keyword table 56 shown in FIG. 3 the keyword "soccer" has already been detected seven times, as a result of which the value of the recurrence count of the keyword "soccer" is incremented to the value 8 and is stored in the keyword memory 55. Likewise, the values of the recurrence counts of the previously detected keywords "World", "Championship" and "Austria" are incremented and stored. The keyword "Germany" is found for the first time and therefore this keyword is entered into the keyword table 56 with the value "1" of the recurrence count and is then stored in the keyword memory 55. Keywords determined automatically in this manner advantageously agree very accurately with the user's interest. Changing fields of interest of the user can be detected by means of the values of the recurrence counts and can be taken into account, as explained hereinbefore, in the determination of television programs which are of interest to the user by the selection means 58.

All the keywords 55 stored in the keyword memory 55 and the values of their recurrence counts are checked periodically, for example once a month, by the keyword detection means 54. The keywords whose recurrence counts have values below a minimum threshold value are then erased from the keyword memory 55 by the keyword detection means 54. This yields the advantage that rarely detected keywords are periodically removed from the keyword memory 55 and the storage capacity of the keyword memory is thus utilized effectively. Furthermore, it is thus achieved that only those keyword are used for determining which television programs are likely to be of interest to the user which have been detected not too long ago and frequently enough.

The video recorder 1 further makes it possible for the user himself to select manually keywords to be used for the autonomous and automatic selection of television programs by the selection means 58. For this purpose, as explained hereinbefore, teletext information TI determined by the information detection stage 33 can be displayed on the viewing screen 4 of the television set 5 in the teletext display mode of the video recorder 1. By the actuation of the marking key 30 the position of a cursor shown on the viewing screen 4 can be changed and title fragment information of the displayed teletext information can be marked manually and is subsequently stored in the keyword memory 55 by the keyword detection means 54 in a manner not shown in FIG. 1. This method of manually selecting a keyword is particularly simple and makes it possible for the user to store also personally selected keywords in the keyword memory 55 and thus additionally define his fields of interest.

It is to be noted that a television signal processing device provided in a television set may include keyword detection means adapted to determine keywords from title information of actually received television programs. This has the advantage that the fields of interest of the user is derived from title information of actually received television programs selected by the user.

It is to be noted that the video recorder may also be adapted to record television programs selected by the selection means as potentially of interest to the user automatically on the magnetic tape 25 of the magnetic-tape cassette 26. Thus, it would be achieved that, for example at night, the user can choose from a selection of television programs which have been recorded during the day and which are for the greater part of interest to him. This automatic recording of television programs which are of interest to the user can be used particularly advantageously in a recording arrangement, for example a digital recording arrangement, having a very large memory—for example a magnetic or an optical disc—for the recording of television programs.

It is to be noted that the display means formed by the television set 3 in the example of an embodiment as shown in FIG. 1 may also be formed by a display provided in a video recorder.

It is to be noted that it is not necessary to provide a television program memory for the storage of television program information determined by the television program information determining means. However, for determining television programs which are of interest to the user and which each have title information containing a given keyword it is then each time necessary to carry out the television program information determining algorithm.

It is to be noted that an information detection stage may be adapted not only to detect teletext information TI formed by a teletext page number TSN for each receiving cycle of the information signal. It has proved to be advantageous if the information detection stage can be preset to at least two teletext page numbers TSN for detecting teletext information TI in each receiving cycle. In this respect it has proved to be particularly advantageous if in the television program information determining algorithm the television program information determining means can preset the information detection stage to a teletext page number stored in a data block address memory and a teletext page number TSN of the received information signal, obtained from a preferential teletext page. This yields the advantage that television program information FPI can be derived in parallel from teletext information TI of two teletext pages, thus enabling television program information to be determined particularly rapidly.

It is to be noted that a television signal processing device in accordance with may, for example, also be provided in a television set. Such a television set may also be adapted to receive a digital television signal (DVB, DTTV).

It is to be noted that, in order to enable an improved periodic erasure of keywords, it is also possible to store for each keyword the date of the last detection of this keyword in a keyword table.

It is to be noted that by means of automatically determined keywords it is also possible to select teletext pages which are of interest to the user and which can be displayed in the teletext display mode.

What is claimed is:

1. A television signal processing device for autonomously determining television program information, comprising:

receiving means for receiving a television signal in a receiving channel receivable by the receiving means, and for receiving an information signal comprising data blocks containing data block information, said information signal being receivable recurrently in blanking intervals of the television signal;

an information detection stage for detecting data block information identified by a given data block address in each receiving cycle of the received information signal;

television program information determining means for determining television program information contained in data block information detected by the information detection stage, and for presetting at least one further data block address for the information detection stage enabling the information detection stage to determine further television program information contained in the information signal; and a switching stage for autonomously switching over the receiving means for the reception of at least one further television signal comprising an information signal in blanking intervals via at least one further receiving channel so as to enable further television program information to be determined autonomously, characterized in that said television signal processing device further comprises:

a data block address memory for storing at least one item of television signal identification information, for identifying a received television signal, or receiving channel identification information in correlation with at least one data block address for identifying a data block of an information signal contained in a television signal received in a receiving channel, wherein each time television program information is determined successfully in detected data block information, the television program information determining means autonomously stores the last preset data block address in the data block address memory in correlation with television signal identification information, which identifies the received television signal, or receiving channel identification information, and wherein, after switching over of the receiving means by the switching stage, said television program information determining means applies a data block address stored in the data block address memory in correlation with television signal identification information, which identifies the received television signal, or receiving channel identification information, autonomously to the information detection stage in order to detect data block information identified by the data block address.

2. The television signal processing device as claimed in claim 1, characterized in that said television signal processing device further comprises a television program memory for storing the television program information derived from the data block information.

3. The television signal processing device as claimed in claim 1, characterized in that said television program information determining means applies, after switching over of the receiving means by the switching stage, a given preferential data block address defined for a received information signal to the information detection stage, and in that the television program information determining means derives at least one data block address from the preferential data block information detected by the information detection stage and identified by the preferential data block address, said at least one data block address identifying data block information from which television program information can de derived.

4. The television signal processing device as claimed in claim 3, characterized in that the television program information determining means determines at least one sub-address number from preferential data block information detected by the information detection stage and identified by a preferential data block address, a sub-address number specifying how many data block sub-addresses in the information signal are assigned to a data block address and how many different items of data block information in data sub-blocks of the data block address, which are identified by data sub-block addresses, can be detected by the information detection stage in a plurality of receiving cycles.

5. The television signal processing device as claimed in claim 3, characterized in that the television program information determining means derives at least one item of transmission information from the preferential data block information detected by the information detection stage and identified by a preferential data block address, an item of transmission information specifying which data block addresses can be supplied to the information detection stage in order to detect data block information from the received information signal.

6. The television signal processing device as claimed in claim 1, characterized in that, after application of a first data block address obtained from the data block address memory, the television program information determining means successively supplies further data block addresses alternately bearing numbers which increase and decrease with respect to the first data block address to the information detection stage in order to detect data block information from the received information signal.

7. The television signal processing device as claimed in claim 1, characterized in that said television signal processing device further comprises an additional information memory for storing additional information for an information signal of a television signal receivable via a receiving channel, in correlation with television signal identification information of the television signal or receiving channel identification information of the receiving channel, said additional information having already been derived during the determination of television program information from said information signal and being used advantageously for a subsequent determination of television program information from said information signal.

8. The television signal processing device as claimed in claim 3, characterized in that the information detection stage detects further data block information, identified by at least one further given data block address, in each receiving cycle of a received information signal, and in that after switching over of the receiving means by the switching stage, the television program information determining means supplies a data block address stored in the data block address memory and a preferential data block address of the received information signal to the information detection stage.

9. A recording and/or reproducing arrangement comprising recording means for recording a processed received television signal of a television program, characterized in that said recording and/or reproducing arrangement further comprises a television signal processing device as claimed in claim 1.

* * * * *